April 17, 1945. K. F. NYSTROM Re. 22,633

RAILWAY CAR SIDE DOOR

Original Filed April 21, 1941 10 Sheets-Sheet 1

Inventor:
Karl F. Nystrom
Attorney

April 17, 1945. K. F. NYSTROM Re. 22,633

RAILWAY CAR SIDE DOOR

Original Filed April 21, 1941 10 Sheets-Sheet 2

Inventor:
Karl F. Nystrom
Antonio Ellison
Attorney

April 17, 1945. K. F. NYSTROM Re. 22,633

RAILWAY CAR SIDE DOOR

Original Filed April 21, 1941 10 Sheets-Sheet 3

Inventor:
Karl F. Nystrom
Attorney

April 17, 1945. K. F. NYSTROM Re. 22,633

RAILWAY CAR SIDE DOOR

Original Filed April 21, 1941 10 Sheets-Sheet 4

Inventor:
Karl F. Nystrom
Antonio Edison
Attorney

RAILWAY CAR SIDE DOOR

Original Filed April 21, 1941 10 Sheets-Sheet 5

Inventor:
Karl F. Nystrom
Attorney

April 17, 1945. K. F. NYSTROM Re. 22,633

RAILWAY CAR SIDE DOOR

Original Filed April 21, 1941 10 Sheets-Sheet 6

Inventor:
Karl F. Nystrom
Ernest E. Olson
Attorney

RAILWAY CAR SIDE DOOR

Original Filed April 21, 1941 10 Sheets-Sheet 7

Inventor:
Karl F. Nystrom
Antonio Fabrizio
Attorney

RAILWAY CAR SIDE DOOR

Original Filed April 21, 1941 10 Sheets-Sheet 8

Inventor:
Karl F. Nystrom
Antonio Cabisius
Attorney

April 17, 1945. K. F. NYSTROM Re. 22,633

RAILWAY CAR SIDE DOOR

Original Filed April 21, 1941 10 Sheets-Sheet 9

Inventor:
Karl F. Nystrom
Attorney

April 17, 1945. K. F. NYSTROM Re. 22,633

RAILWAY CAR SIDE DOOR

Original Filed April 21, 1941 10 Sheets-Sheet 10

Inventor:
Karl F. Nystrom
Attorney

Reissued Apr. 17, 1945 Re. 22,633

UNITED STATES PATENT OFFICE 22,633

RAILWAY CAR SIDE DOOR

Karl F. Nystrom, Nashotah, Wis., assignor to Standard Railway Equipment Manufacturing Company, a corporation of Delaware Original No. 2,340,014, dated January 25, 1944, Serial No. 389,487, April 21, 1941. Application for reissue February 16, 1945, Serial No. 578,141

14 Claims. (Cl. 20—22)

This invention relates to side doors for railway cars and more particularly to railway cars having a great inside width while falling within the maximum outside width defined by the clearance lines which are specified by the Association of American Railroads. Railway cars commonly have doorways in the side walls thereof and doors for closing such doorways are commonly movable in planes substantially parallel with the side walls of the car. The necessary characteristics of such doors are that they be strong enough to resist thrusts from the inside of the car caused by the shifting of the lading and that they form reasonably tight seals with the frame members around the doorways to prevent the entrance of moisture, cinders and other foreign matter into the interior of the car.

An object of my invention is to provide a car having a clear inside width of 9′ 6″ and an overall outside width of 10′ 8″, which latter dimension is the maximum permitted for interchange among the various railroads of the country. The conventional type of side door is one in which the operating mechanism for the door, such as rollers, starting lever, lock and handle are mounted upon the outside face of the door and the width of such members necessarily restricts the inside width of the car. I accomplish the above mentioned object by placing the door track and the rolling means for the door substantially below the door. This is an improvement over the provision of such rolling means on the outside face of the door as the additional clearance obtained permits an increase of the inside width of the car.

Another object is to form an effective seal completely around the door to prevent the entrance of foreign matter into the interior of the car. I accomplish this object, first, by constructing the door and then using such door as a gauge around which certain framing members of the car are positioned and then secured together to form a rigid doorway frame. The doorway frame is thus custom built to the size of the door, thereby eliminating the openings usually caused by the inherent variations in size of a door and doorway frame. The second method contributing to the accomplishment of the above object is the arranging of the door, doorway frame and operating mechanism for the door in such a way that a seal is formed as a result of the closing movements of the door, as will hereinafter be explained in detail.

Another object of the invention is to use the door track as a reinforcement. The side wall of a railway car is naturally weak at the doorway, both for the reason that the doorway constitutes an inherent weakness in the side wall and for the reason that the doorway is commonly in the center of the car where the beam stress is the greatest. I rigidly attach the track to the side sill below the doorway to provide the reinforcement and also utilize a part of the track for the purpose of underlying and supporting part of the threshold plate.

Another object is to provide a door operating means wherein the closing movement of the door moves such door outwardly from the car a distance sufficient to form seals on certain edges of the door. The lading within the car is frequently thrown against the door to cause an outward thrust on such door and, in the construction herein disclosed, such outward thrust tends to provide a still tighter and more effective seal around the edges of the door whereas in certain types of conventional car the closing of the door tends to create an opening rather than an effective seal.

In the type of door herein disclosed, the operating means comprises rollers pivotally mounted upon the door and arranged to roll, during opening and closing movements, upon a track mounted upon the car. The track is provided with depressions positioned so that when the door is in the full opened or full closed position, the weight of the door is removed from the rollers and transferred to a rigid member of the door so that the friction between such rigid member and the door track retards movement of the door. In a conventional construction, said rigid member is comprised of the roller housings which are commonly castings. The difficulty of maintaining a large area of frictional contact, due to irregularities in the castings, reduces the frictional resistance to moving and permits the door to open or close itself unexpectedly during service movements of the car. In the invention herein disclosed, I use pressed or rolled parts for the above mentioned rigid member, thereby obtaining a more even contact between such member and the door track and consequently a greater frictional resistance to moving. Such pressed or rolled member may be the lower frame member of the door.

Another object of the invention is to provide a door lock which does not interfere with sealing strips on the edges of the door and doorway frame, which method of accomplishing such means will be hereinafter pointed out in detail.

Another object is to utilize the door track for the double purpose of providing a support for rolling movement of the door and of placing a limitation upon the upward movement thereof. The use of a unitary member to accomplish these two purposes eliminates the effect of inaccuracies in assembling the various parts of the car.

As hereinabove pointed out, I use the door as a gauge for positioning the various parts of the doorway frame during assembly of such frame and I also utilize the door track as a gauge from which the positions of the other parts of the doorway frame may be determined.

When the door is in the full opened or full closed position, the weight is preferably removed from the rollers and the door is supported by friction surfaces at the upper and lower edges, which surfaces, according to my present invention, are preferably inclined. Such inclination permits the door to deflect laterally; that is, inwardly or outwardly, and thereby permits the upper and lower edges thereof to ride upwardly or downwardly on the inclined surfaces so as to compensate for slight irregularities in the shape of the door and in the positioning of the members having such inclined surfaces.

Another object is to provide a sealing means at the lower edge of the door, which sealing means is formed by a lower door member being disposed relatively close to the side sill of the car and an upper door member being disposed relatively close to the threshold plate of the car, thereby providing two seals. I also provide a trough between the seals for the purpose of trapping and carrying away liquid which passes through the outermost seal.

Another object is to utilize the above mentioned rigid member on the door as a guide to restrict lateral motion during horizontal rolling movement of the door in addition to using such member to form a friction element to retard movement of the door when in the full opened or full closed position.

Other objects and advantages of my invention will be apparent from the following detailed description by referring to the accompanying drawings.

In the drawings:

Fig. 1 is a side elevation of a portion of a railway car showing one embodiment of my invention.

Figs. 2 and 3 are sections on lines 2—2 and 3—3, respectively, of Figure 1.

Figure 3:
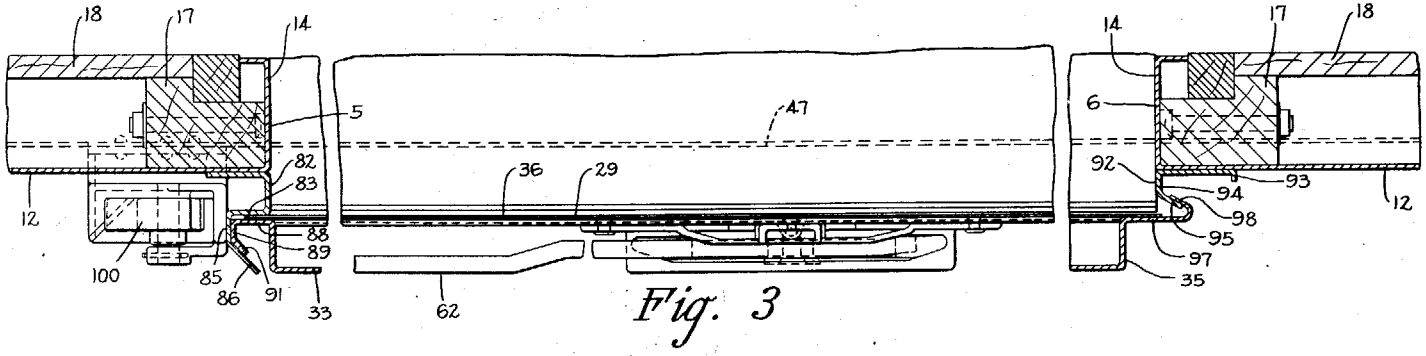

Figs. 14 to 17, inclusive, are views similar to a portion of Figure 3 showing modified forms of the invention.

Figure 2:
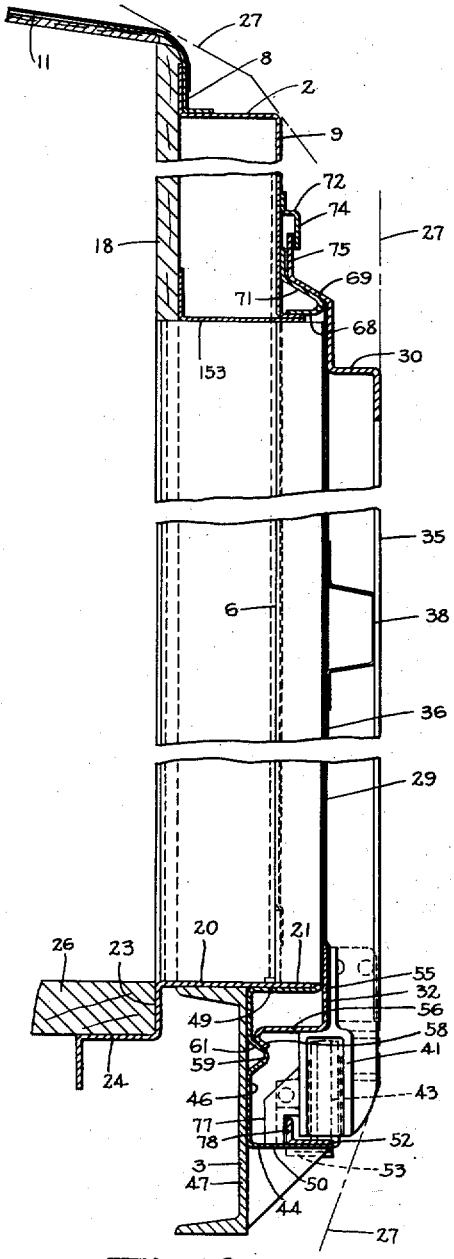
Figure 18:
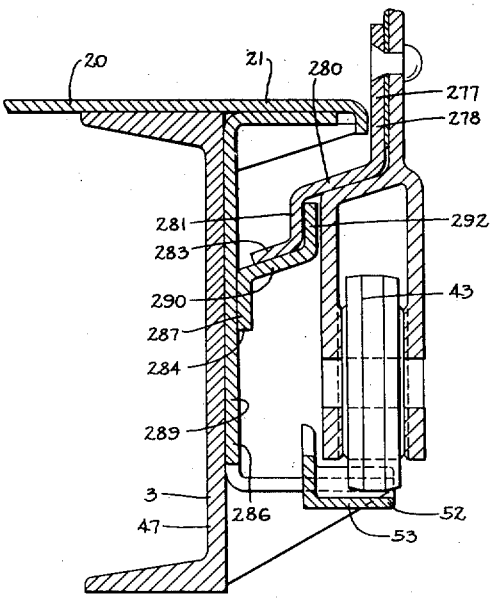
Figure 20:
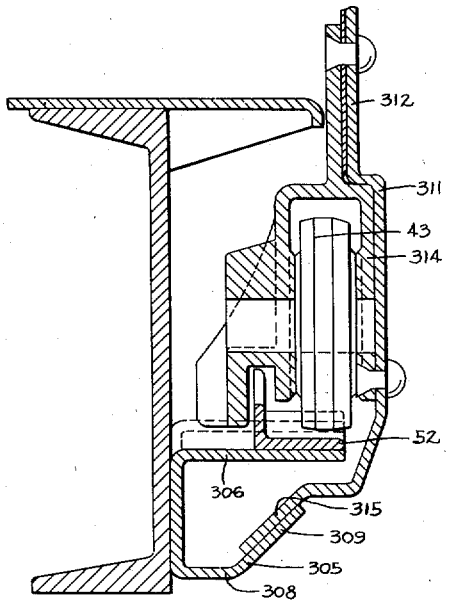
Figure 19:
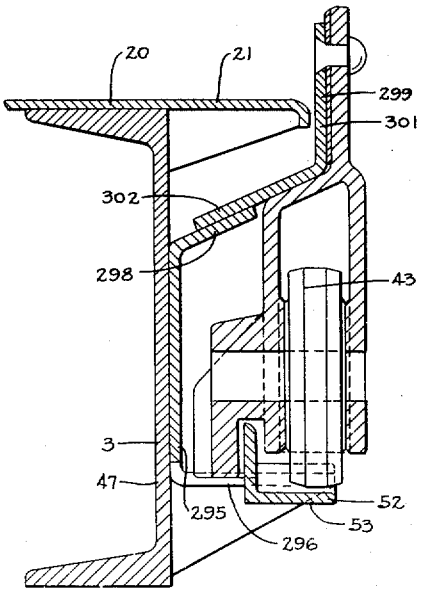

Figs. 18 to 20, inclusive, are views similar to the lower part of Figure 2, showing further modifications of my invention.

Figure 21:
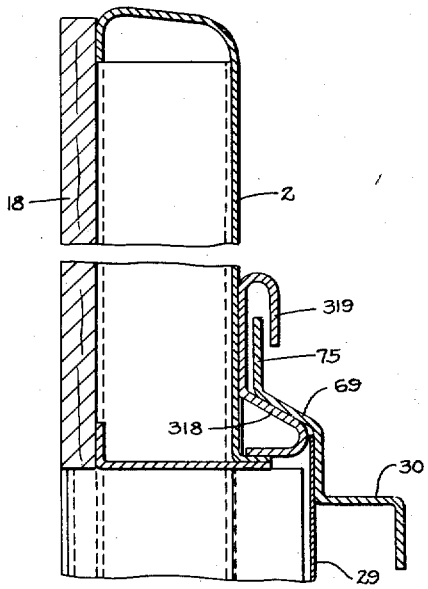
Figure 22:
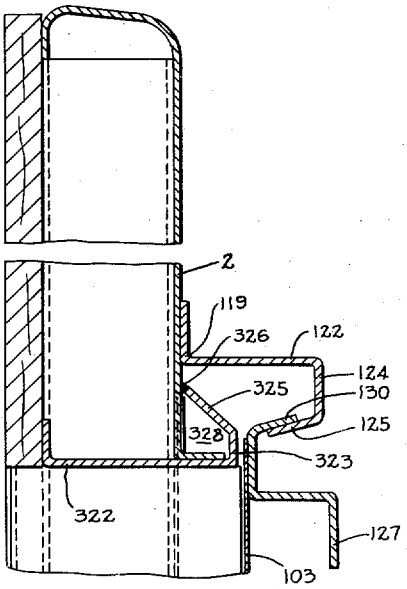

Figs. 21 and 22 are views similar to the upper part of Figure 2, showing further modifications of my invention.

Figure 24:
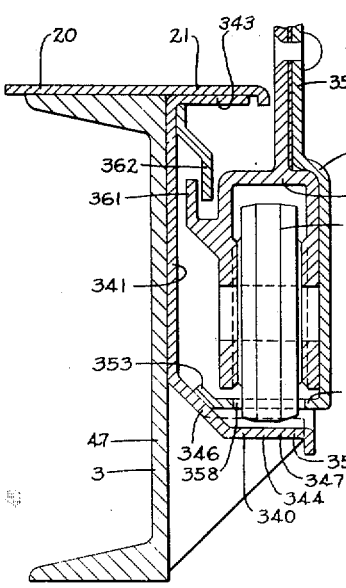
Figure 23:
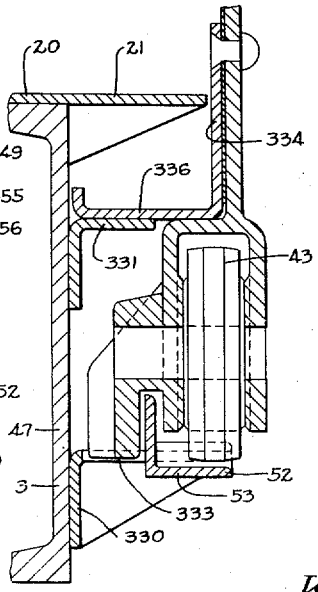

Figs. 23 and 24 are views similar to the lower part of Figure 2, showing other modifications of my invention.

Figure 1:
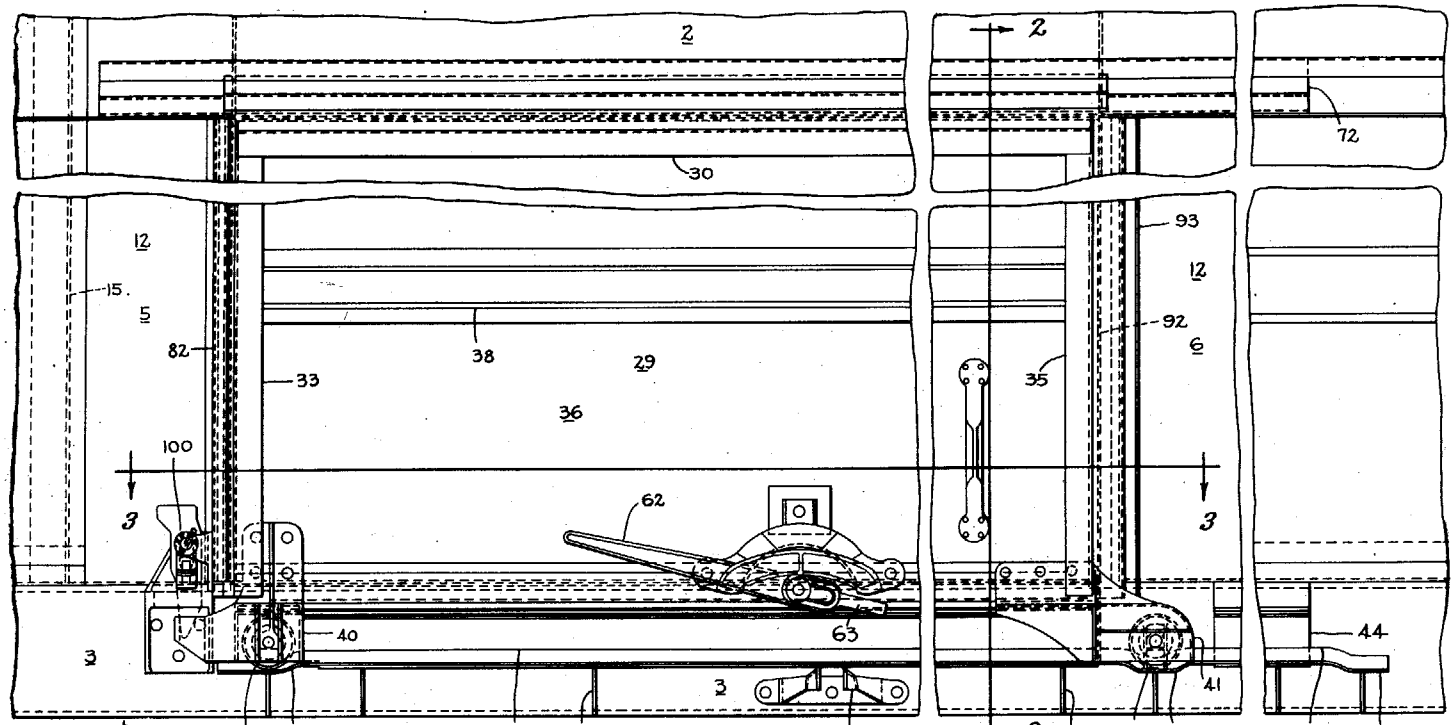

In the modification of my invention shown in Figures 1 to 3, a portion of a railway car is disclosed having the usual side plate 2, side sill 3 and vertical posts, such as the door posts 5, 6, extending between and secured to the plate 2 and sill 3. The present invention is particularly related to the door and doorway structure of the car; the other parts of the side wall may be of any convenient design such as, for example, that shown in my Patent No. 2,150,897 dated March 21, 1939. As is usual in this type of car, the side sill 3 is a common part of the underframe and the side wall and, in the form shown, comprises an inwardly facing channel. The side plate 2 is comprised of an upper portion 8 and a lower portion 9 with the car roof 11 being secured to the upper portion 8. The door posts 5, 6, shown more particularly in Figure 6, each comprise a flat part 12 substantially in the outer plane of the side wall, an inwardly directed flange 14 defining an edge of the doorway and a Z bar 15 formed on the opposite side of the post from the flange 14. Filler strips 17 are secured to the posts 5, 6 for the purpose of attaching the side wall lining 18 as shown in Figure 3. The threshold plate 20 is supported on the upper surface of the side sill 3 and extends outwardly (21) beyond such sill and also downwardly (23) and inwardly (24) for the purpose of supporting the car floor 26.

Figure 4:
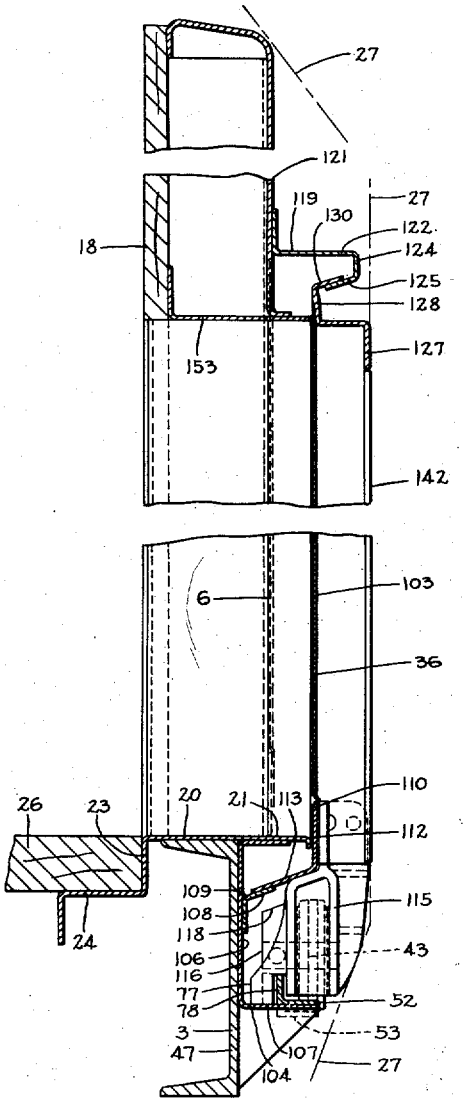
Figs. 4 and 5 are sections similar to Figures 2 and 3, respectively, showing a modified form of the invention.

The broken line 27 shown in Figures 2 and 4 is the established clearance line; that is, no part of the car is permitted to extend outwardly beyond this line. As shown most clearly in Figure 6, the door 29 is made up of a rectangular framework comprised of the top frame strip 30, the bottom frame strip 32, the front frame strip 33 and the rear frame strip 35. This framework supports a relatively thin metallic sheathing 36 formed with substantially horizontal stiffeners 38 extending between the front (33) and rear (35) frame strips.

The door 29 has front (40) and rear (41) roller housings rigidly secured thereto with rollers 43 pivotally mounted within the housings. The door track is a channel member 44 having its web 46 secured to the outer side of the web 47 of the channel shaped sill 3 with its upper flange 49 underlying and supporting the outwardly projecting part 21 of the threshold plate 20. The lower flange 50 of the channel track member 44 supports the tread which is an angle 52 upon which the rollers 43 roll during horizontal movement of the door 29. The lower flange 50 is coped so that the tread 52 may be depressed (53) at certain places below the general level of the tread.

The bottom frame strip 32 of the door 29 comprises a vertical leg 55 secured to the door substantially in the plane of the door sheathing 36 and a horizontal leg 56 extending inwardly below the threshold plate 20. The horizontal leg 56 is formed with a flange 58 inclined downwardly and outwardly from the car. The web 46 of the channel track member 44 has formed therein an outwardly projecting, horizontally extending corrugation 59 with the upper side 61 thereof inclined downwardly and outwardly substantially complementary with the flange 58 of the bottom frame strip 32. The depressions 53 in the tread 52 are arranged so that when the door 29 is in the full opened or full closed position, the rollers 43 are above the depressions 53 and the weight of the door is taken by the flange 58 of the bottom frame strip 32 engaging the upper side 61 of the corrugation 59. The rollers 43 are then out of engagement with the tread 52 and may be rotated freely.

When the door 29 is in the full opened or full closed position, the weight of the door causes the bottom frame strip flange 58 to bear upon the corrugation 59 and induces a frictional resistance to sliding movement of the flange 58 on the corrugation 59 which frictional resistance retards horizontal movement of the door. When the door 29 is in any position between full opened and full closed, the rollers 43 engage the undepressed parts of the tread 52 and the door moves freely in a horizontal direction. In order to overcome the above mentioned frictional resistance and move the door 29 into such position that the rollers are operative, a starting lever 62 is pivotally mounted upon the door 29, which lever 62 has a projection 63 on the lower end thereof arranged to engage a starting bracket 65 secured to the side sill 3 so that a leverage may be exerted to pry the door 29 into rolling position. The operation of the starting lever 62 is more fully explained in Schlesinger Patent No. 1,963,152 dated June 19, 1934.

The rollers 43 are above the depressions 53, as hereinabove explained, when the door 29 is in the full closed position; the flange 58 of the bottom frame strip 32 then engages the inclined upper side 61 of the corrugation 59 and tends to move the door 29 outwardly from the car. In other words, the weight of the door 29 tends to cause it to slide down the inclined side 61 of the corrugation 59. Similarly, at the top edge of the doorway, a sealing strip 68 is secured to the side plate 2 of the car and the top frame strip 30 of the door 29 has a downwardly and outwardly inclined part 69 arranged substantially complementary with a downwardly and outwardly inclined part 71 of the top sealing strip 68. The weight of the door 29 also causes such door to tend to slide down the inclined part 71 of such sealing strip 68. The outward movement of the door is limited at the top by a hood 72 having a depending flange 74 arranged to engage an upstanding part 75 of the top frame strip 30 and at the bottom by depending lips 77 on the roller housings arranged to engage the upstanding flange 78 of the tread angle 52.

As shown in Figure 3, the front door stop 82 is secured to the front door post 5 and includes a pocket formed by a forwardly directed flange 83, an outwardly directed web 85 and a reflange 86 inclined outwardly and rearwardly from the web 85. The front frame strip 33 of the door 29 has a flange 88 disposed substantially in the plane of the door sheathing 36, an outwardly directed web 89 and a reflange 91 inclined outwardly and rearwardly substantially complementary with the reflange 86 of the door stop 82. A spark strip 92 is secured to the rear door post 6 and includes an outwardly directed flange 94 and a reflange 95 inclined outwardly and rearwardly. The rear frame strip 35 of the door 29 includes a web 97 substantially in the plane of the door sheathing 36 and a flange 98 inclined inwardly and forwardly substantially complementary with the reflange 95 of the spark strip 92. The spark strip 92 may be provided with a lip 93 so that, when the rear door post 6 is leading, the lip 93 deflects foreign matter away from the seal formed by the reflange 95 and flange 98. When the door 29 is moved outwardly by the means provided at the top and bottom of the door as hereinabove described, the reflanges 91, 86 of the front frame strip 33 and front door stop 82, respectively, engage to seal the front edge of the doorway and the flange 98 of the rear frame strip 35 engages the reflange 95 of the spark strip 92 to seal the rear edge of the doorway. It is pointed out that any thrust upon the door 29 from the interior of the car tends to increase rather than decrease the effectiveness of the door seals.

The locking mechanism 100 disclosed in Figures 1 and 3 will be described in detail hereinafter.

Figure 5:
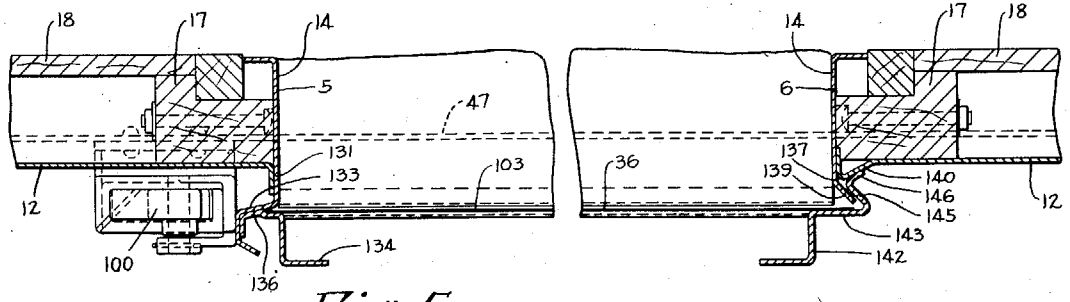

Figures 4 and 5 show a modified construction in which the door 103 moves inwardly when the weight is removed from the rollers 43 in contrast with the structure disclosed in Figures 1 to 3 wherein the door is moved outwardly. The door track 104 comprises a channel member secured by its web 106 to the side sill 3 as hereinabove described and having a tread angle 52 carried by the lower flange 107 of the channel member 104. A friction member 109 for supporting the door 103 when the weight is removed from the rollers 43 consists of an angle having a downwardly and inwardly inclined flange 108 rigidly secured to and forming a part of the door track 104. The friction member 109 may be formed of a plurality of angles spaced apart longitudinally of the car or, as an alternative, a continuously extending angle. The bottom frame strip 110 of the door 103 shown in this modification is comprised of a vertical leg 112 secured to the door 103 and a downwardly and inwardly inclined leg 113 arranged substantially complementary with the inclined flange 108 of the friction member 109 so that, as the weight of the door 103 is removed from the rollers 43 and transferred to the bottom frame strip 110, the weight of the door tends to move the door inwardly toward the car. The roller housing 115 is provided with a boss 116 have its upper surface 118 inclined in substantial conformity with the under side of the inclined flange 108 of the friction member 109 so as to restrict upward movement of the door 103 and thereby prevent disengagement from the tread angle 52.

At the upper side of the doorway frame, a hood 119 is secured to the side plate 121 and has a horizontal web 122, a depending flange 124 and a reflange 125 inclined inwardly and downwardly. The top frame strip 127 of the door 103 has a substantially vertical flange 128 and an upwardly and outwardly extending reflange 130 arranged to overlie and be complementary with the reflange 125 of the hood 119. Then when the weight of the door is removed from the rolllers 43 by reason of such rollers being disposed above the depressed parts 53 of the tread 52 as hereinabove described, the reflanges 125, 130 of the hood 119 and top frame strip 127, respectively engage and tend to move the door 103 inwardly toward the car. As shown in Figure 5, the front door stop 131 has a flange 133 inclined forwardly and outwardly and the front frame strip 134 of the door has a flange 136 substantially complementary with the flange 133 of the front door stop 131, which flanges 133, 136 engage to seal the front edge of the doorway when the door 103 is moved inwardly as hereinabove described. The spark strip 137 is formed integral with a part of the rear door post 6 and comprises an outwardly and rearwardly directed flange 139. The rear door post 6 is provided with an outwardly projecting, vertically extending corrugation 140 adjacent to the spark strip 137. The rear frame strip 142 of the door 103 has a web 143 substantially in the plane of the door sheathing 36, a forwardly and inwardly directed flange 145 and an inwardly and rearwardly directed reflange 146. The reflange 146 of the rear frame strip 142 engages a part of the corrugation 140 to seal the rear edge of the doorway when the door is moved inwardly as described above.

Figure 6:
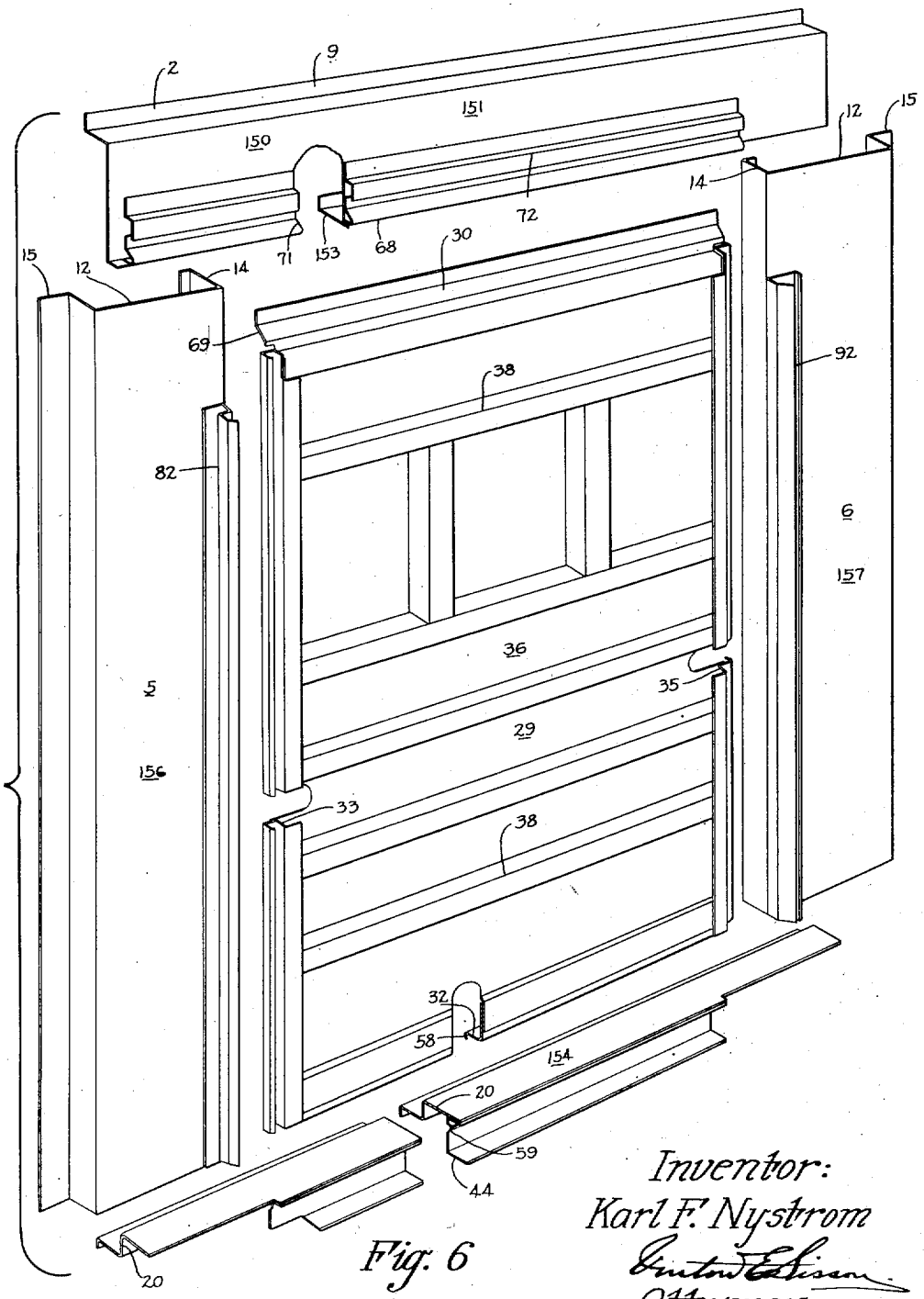
Fig. 6 is an exploded view showing the door and doorway frame members in their proper relation.

Figure 6 illustrates the method of assembly of the doorway frame to obtain small clearances between all the cooperating sealing parts of the door and doorway frame. The door 29 is first constructed and, as disclosed in Figures 1 to 3, it is comprised of a front frame strip 33, a rear frame strip 35, a top frame strip 30, a bottom frame strip 32 and sheathing 36 including stiffeners 38 secured to the frame strips.

The doorway framing is assembled from four parts. The lower part 9 of the side plate 2 of the car is preferably made in several pieces and one (150) of such pieces forms a part of the upper side 151 of the doorway framing. A header 153, top sealing strip 68 and hood 72 are rigidly secured to the side plate piece 150, thereby forming the upper side 151 of the doorway frame. The lower side 154 of the doorway frame consists of the threshold plate 20 and the channel track member 44 rigidly secured together. The front door post 5 and front door stop 82 are rigidly secured together to form the front side 156 of the doorway frame and the rear door post 6 and spark strip 92 are secured together to form the rear side 157 of the doorway frame.

The door 29 is then placed in a jig and the lower side 154 of the doorway frame is arranged adjacent to the lower edge of the door 29 with the upper side of the corrugation 59 in contact with the inclined flange 58 of the bottom frame strip 32. The upper side 151 of the doorway frame is placed adjacent to the top edge of the door with the inclined part 71 of the top sealing strip 68 engaging the inclined part 69 of the top frame strip 30. The front (156) and rear (157) sides of the doorway frame are assembled in a similar manner with the cooperating sealing parts of the door and doorway frame disposed in contact.

The four sides of the doorway frame are then rigidly secured together, preferably by welding and placed on the car in proper relation to the other parts of the car, which other parts have preferably been also assembled as units. In order to be certain that the respective door and doorway frame are used on the same car, it is preferable to keep the door 29 attached to the frame while the latter is applied to the car. After the assembled frame is in the proper position relative to the other parts of the car, the track member 44 and threshold plate 20 are secured to the side sill 3 and the piece 150 of the side plate 2 which forms a part of the doorway frame is then secured to the other pieces of the side plate 2.

Figure 7:
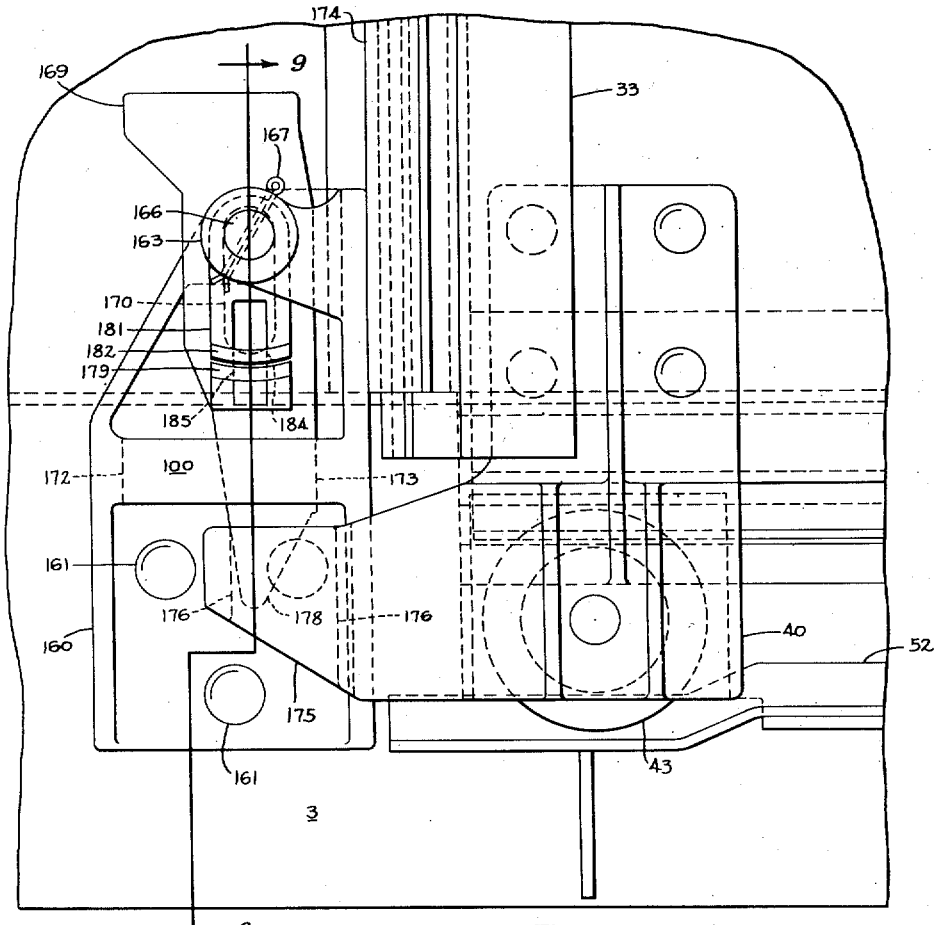
Fig. 7 is an enlarged view of the lock mechanism shown in Figure 1, the door being fully closed and locked.
Figure 8:
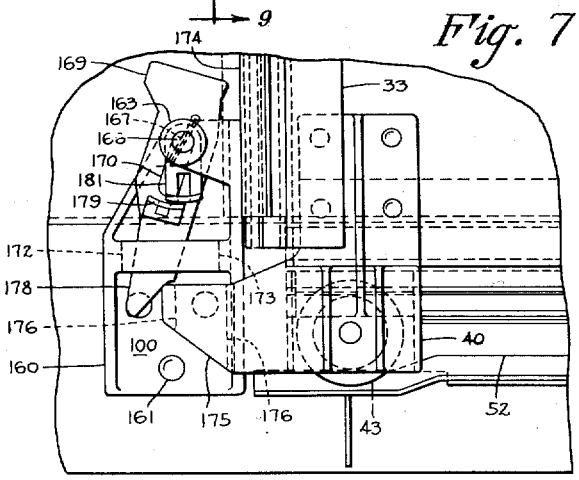
Fig. 8 is a view of the lock mechanism shown in Fig. 7 when the door is in full closed position but not locked.
Figure 9:
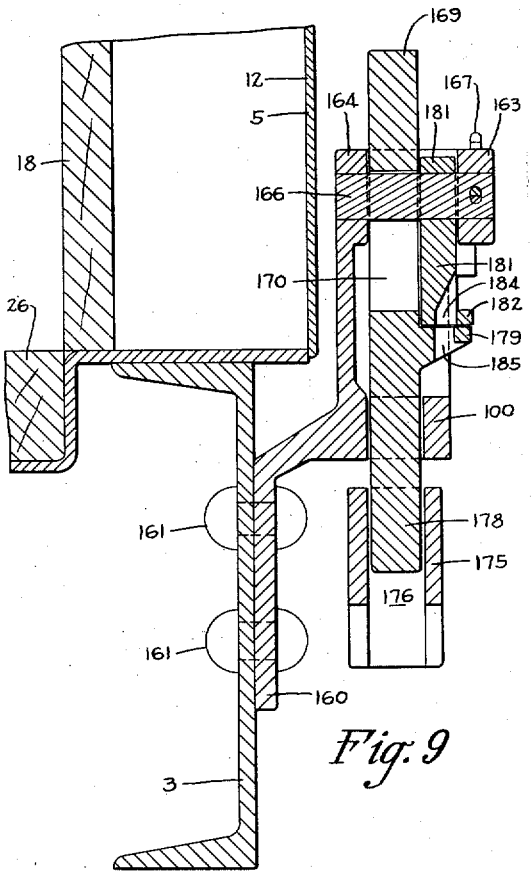
Fig. 9 is a section on line 9—9 of Figure 7.

The locking mechanism 100 for the door 29, as shown in Figures 7 to 9, is comprised of a bracket 160 rigidly mounted, preferably by means of rivets 161, upon the side sill 3 of the car and arranged to extend upwardly and outwardly therefrom. The upper part of the bracket 160 carries a pair of spaced apart lugs 163, 164 having aligned holes therethrough and a rigid pin 166 is inserted through both holes and held in place by a cotter key 167. A latch member 169 has a vertically extending slot 170 therethrough and the pin 166 projects through the slot 170 so that the latch member 169 is slidable vertically to an extent limited by the length of the slot 170. The latch member 169 is also free to rotate upon the pin 166 as a fulcrum, which rotation is limited by the parts 172, 173 of the bracket 160.

The front roller housing 40 has a nose 175 which protrudes beyond the front edge 174 of the door 29 and has a vertically extending hole 176 therethrough. When the door 29 is in the full closed position, as shown in Figure 7, the lower end 178 of the latch member 169 is disposed in the hole 176 in the roller housing nose 175 and thereby prevents horizontal movement of the door 29. The latch member 169 is provided with an outwardly projecting lug 179 and a dog 181 is pivotally mounted upon the pin 166 and also provided with an outwardly projecting lug 182 aligned with the lug 179 when the lock is in the locked position, as shown in Figure 7. The lug 182 has a hole 184 arranged to align with the hole 185 in the latch member lug 179 when the lock is in the position shown in Figure 7. The latch member 169 is thus prevented from moving vertically and the door 29 is, therefore, locked in the full closed position. A seal may be inserted through both the holes 184, 185 so that any unauthorized opening of the door 29 may be detected by railroad officials, or others responsible for maintaining the car in the sealed condition.

When the door 29 is in an opened position, both the latch member 169 and the dog 181 hang by their own weight in depending positions. When door 29 is moved to the full closed position as shown in Figure 8, the latch member 169 rotates about the pin 166 to the position shown. In order to lock the door 29, it is necessary to rotate the dog 181 until the lug 182 thereof is moved out of the path of the lug 179 on the latch member 169; then the latch member 169 may be moved upwardly and then downwardly until the lower end 178 thereof is inserted in the hole 176 through the nose 175 of the roller housing 40. The dog 181 is then rotated to the position shown in Figure 7 and the seal may be inserted through the holes 184, 185 for the purpose of sealing the door. In order to open the door, the above described operation is performed in reverse.

Figure 10:
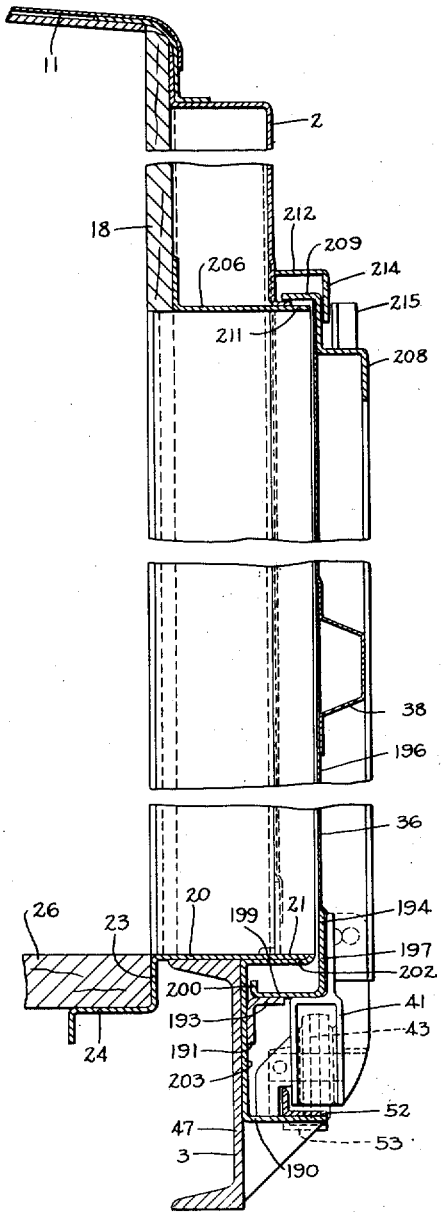
Fig. 10 is a view similar to Figure 2 showing another modified form of the invention.

The structure shown in Figure 10 is similar in many respects to that shown in Figure 2. The track is a channel member 190 which carries the tread angle 52 and reinforces the threshold plate 20 as hereinbefore described. The friction member 191 may be comprised of intermittent pieces or a continuous piece secured to and forming a part of the channel member 190 and, in the modification shown, has an upper flange 193 which is substantially horizontal. The bottom frame strip 194 of the door 196 is comprised of a vertical leg 197 attached to the door 196 and a horizontal leg 199 extending inwardly below threshold plate 20 and arranged to rest upon the upper flange 193 of the friction member 191 when the weight of the door 196 is removed from the rollers 43. The horizontal leg 199 is formed with an upstanding flange 200 which engages with the upper flange 202 of the channel track member 190 to limit upward movement of the door 196.

The upstanding flange 200 of the bottom frame strip 194 preferably terminates close to the web 203 of the channel track member 190 so as to restrict the amount of moisture and other foreign matter which may pass therebetween. The vertical leg 197 of the bottom frame strip 194 is relatively close to the outer edge of the threshold plate 20, also for the purpose of restricting the passage of foreign matter into the car. The channel formed by the vertical leg 197, horizontal leg 199 and upstanding flange 200 of the bottom frame strip 194 functions to drain off any liquid which happens to pass between the upstanding flange 200 and the web 203 of the channel track member 190.

At the top of the doorway frame shown in Figure 10, the door header 206 projects outwardly beyond the side plate 2. The top frame strip 208 of the door 196 has an inwardly directed flange 209 overlying a part 211 of the header 206 and a hood 212 overlies the flange 209 of the top frame strip 208 and includes a flange 214 disposed outwardly therefrom. Upstanding fingers 215 on the door 196 cooperate with the hood 212 to guide the top of the door 196 during its horizontal movement.

Figure 11:
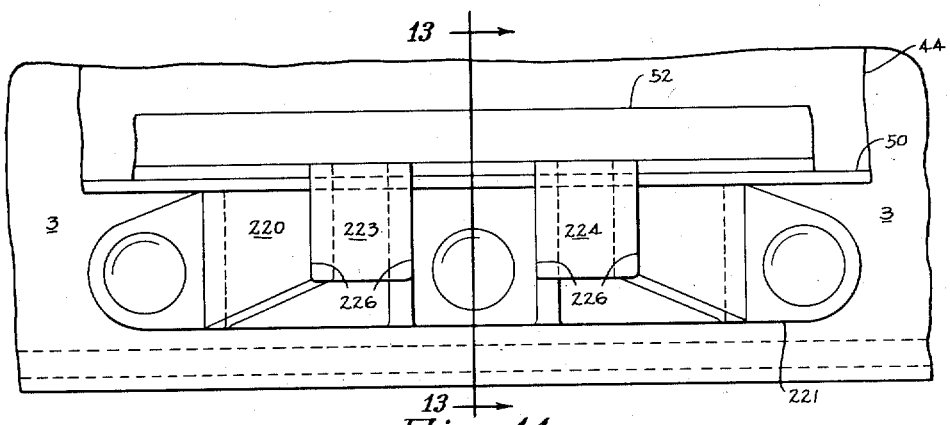
Fig. 11 is an elevational view of a modified form of starting bracket of the general type disclosed in Figure 1.
Figure 12:
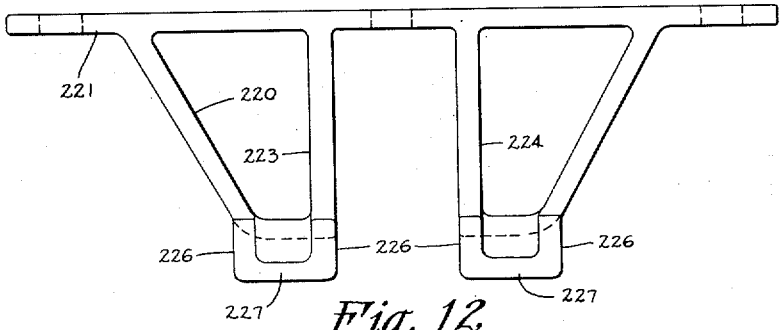
Fig. 12 is a plan view of the bracket shown in Figure 11 with the door track not shown for clarification.
Figure 13:
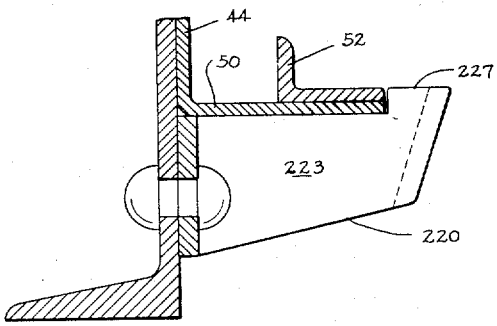
Fig. 13 is a section on line 13—13 of Figure 11.

Figure 1 shows a bracket 65 secured to the sill 3 and arranged to cooperate with the starting lever 62 to move the door 29 to a rolling position. Figures 11 to 13 show a modified form of such bracket. The bracket 220 comprises a base 221 secured to the sill 3 and outstanding, spaced apart lugs 223, 224 having vertical faces 226 on both sides thereof so that the starting lever 62 may engage any one of four surfaces 226 for the purpose of moving the door 29. The lugs 223, 224 underlie the lower flange 50 of the channel track member 44 for the purpose of supporting the track member and extend outwardly beyond the tread angle 52 and upwardly (227) for the purpose of engaging the lower end 63 of the starting lever 62. Additional track supports may be provided by edgewise disposed plates 229, preferably welded in position, as shown in Figure 1.

Figure 14:
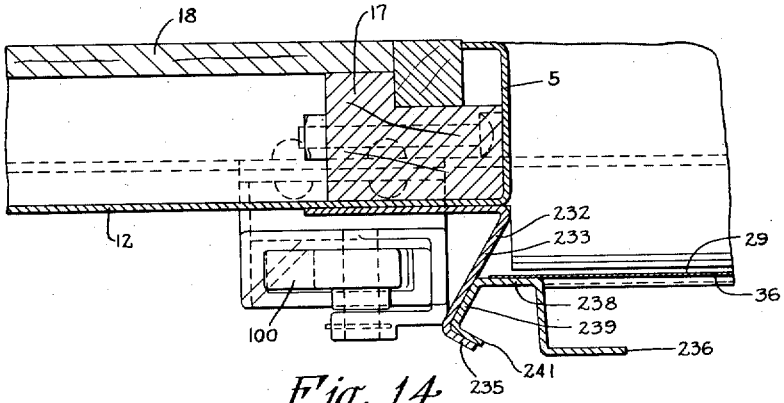

In the modification shown in Figure 14, the front door stop 232 comprises an outwardly and forwardly directed web 233 and an outwardly and rearwardly directed flange 235. The front frame strip 236 of the door comprises a flange 238 substantially in the plane of the sheathing 36 of the door, a web 239 projecting outwardly and forwardly therefrom substantially complementary with the web 233 of the door stop 232 and a reflange 241 extending outwardly and rearwardly substantially complementary with and engaging the flange 235 of the front door stop 232. The structure shown in Figure 14 may be substituted for that shown in either Figures 2 or 4, preferably that shown in Figure 2.

Figure 15:
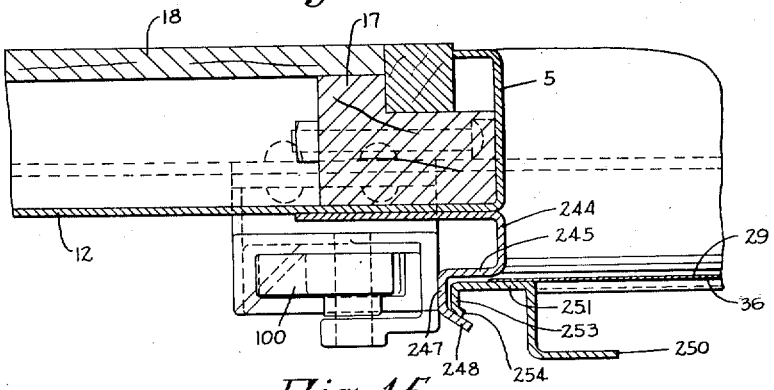

In the modification shown in Figure 15, the front door stop 244 comprises a flange 245, an outwardly directed web 247 and an outwardly and rearwardly directed reflange 248. The front frame strip 250 on the door has a flange 251 disposed substantially in the plane of the door sheathing 36, an outwardly directed web 253 and an outwardly and rearwardly directed reflange 254. The frame strip 250 and door stop 244 are proportioned in such a way that the reflange 254 of the frame strip 250 engages the reflange 248 of the door stop 244 before the respective webs 253, 247 engage, thereby forming a tighter seal.

Figure 16:
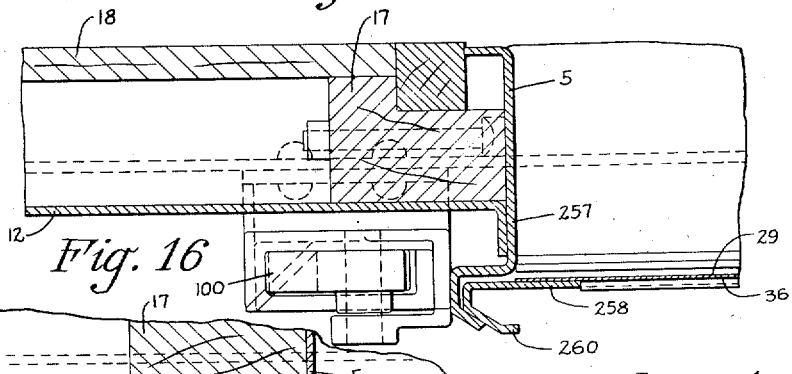

In the modification shown in Figure 16, the front door stop 257 is formed integral with a part of the front door post 5; otherwise the structure differs from Figure 15 only in the form of front frame strip 258 which embodies a rearwardly directed lip 260 for the purpose of stiffening the front edge of the door.

Figure 17:
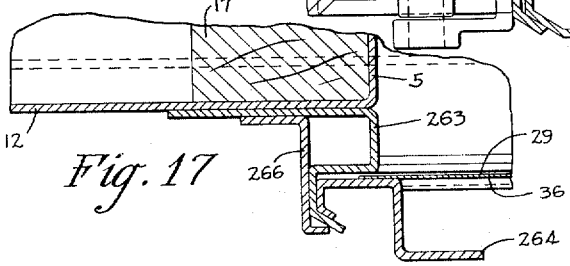

Figure 17 discloses a front door stop 263 and a front frame strip 264 substantially as shown in Figure 15. Reinforcing means 266 are provided for the door stop 263, which means is either a series of vertically spaced clips or a vertically extending member, preferably the former.

Figure 18 is somewhat like the lower part of Figure 4, except in the means provided for guiding the door during the horizontal rolling movement thereof. The lip 77 provided on the roller housing 41 as shown in Figure 4 is dispensed with and the hereinafter described means provided in place thereof. The bottom frame strip 277 of the door comprises a vertical leg 278 secured to the door, an inwardly and downwardly inclined leg 280, a depending flange 281 and an inwardly and downwardly inclined reflange 283. The friction member 284, which is secured to and forms a part of the track member 286, consists of a vertical leg 287 secured to the web 289 of the channel track member 286, an upwardly and outwardly inclined leg 290 and an upstanding flange 292. The inclined leg 290 of the friction member 284 and the inclined reflange 283 of the bottom frame strip 277 engage to provide frictional resistance to horizontal movement of the door when the weight of the door is taken off the rollers 43. The upstanding flanges 292 of the friction member 284 and the depending flange 281 of the bottom frame strip 277 engage to guide the door during its rolling horizontal movement upon the track 286.

In the modification shown in Figure 19, the track 295 is a channel member wherein the lower flange 296 thereof supports the tread angle 52 in a manner similar to that disclosed in Figure 2. The upper flange 298 of the channel member 295 is spaced below the threshold plate 20 and inclined upwardly and outwardly to form a friction member. The bottom frame strip 299 of the door comprises a vertical leg 301 secured to the door and a downwardly and inwardly inclined leg 302 which engages the upper flange 298 of the channel track member 295 for the purpose of providing frictional resistance to the movement of the door when the weight of the door is taken off the rollers 43. The door is thereby moved inwardly as pointed out with reference to Figure 4.

Figure 20 discloses a modification wherein the members which cooperate to frictionally resist movement of the door are disposed below the tread 52 and rollers 43. The track is a channel member 305 having the tread angle 52 mounted upon the upper flange 306 thereof; the lower flange 308 of the channel member 305 has a part 309 inclined upwardly and outwardly. The bottom frame strip 311 of the door has an upper part 312 secured to the door and arranged to extend downwardly and outwardly of the roller housing 314. The lower part 315 of the bottom frame strip 311 is inclined inwardly and downwardly and engages the part 309 of the lower flange 308 of the channel track member 305 for the purpose of providing frictional resistance to horizontal movement of the door and of tending to move the door inwardly when the weight of the door is removed from rollers.

Figure 21 discloses an arrangement at the top side of the doorway frame similar to that shown in Figure 2 except that, in the modification shown in Figure 21, the top sealing strip 318 and the hood 319 are made in one piece.

Figure 22 discloses an arrangement at the top of the doorway frame similar to that shown in Figure 4. The door header 322 extends outwardly beyond the outer face of the side plate 2, is flanged upwardly (323) and then inclined upwardly and inwardly (325) and preferably welded (326) to the side plate 2 so as to form a box beam reinforcement 328 at the upper side of the doorway.

Figure 23 discloses a modification wherein the track (330) and friction (331) members are separate parts whereas in most of the structures hereinbefore disclosed, the friction member is rigidly secured to and forms a part of the track member. The track member 330 is comprised of an angle secured to the side sill 3 and supporting a tread angle 52 secured to the horizontal leg 333 thereof. The friction member 331 is also an angle secured to the side sill 3 in spaced relation above the track member 330 and the bottom frame strip 334 of the door has an inwardly directed, substantially horizontal leg 336 which engages the friction member 331 for purposes hereinbefore described.

In the modification disclosed in Figure 24, the track comprises a channel member 340 having its web 341 secured to the web 47 of the side sill 3 and its upper flange 343 underlying and supporting the threshold plate 20. The lower flange 344 of the channel member 340 is comprised of a downwardly and outwardly inclined part 346 and a substantially horizontal part 347. The bottom frame strip 349 of the door comprises an upper part 350 secured to the door and a lower part formed with an inwardly directed, substantially horizontal flange 352 and an upwardly and inwardly inclined reflange 353 substantially complementary with the inclined part 346 of the lower channel flange 344. Roller housings 355 are mounted upon the door and rollers 356 are revolubly mounted within the housings 355, the rollers 356 extending through openings 358 in the flange 352 so as to engage the substantially horizontal part 347 of the channel member 340 for the purpose of moving the door horizontally. The substantially horizontal part 347 of the track 340 is formed with depressions 359 at predetermined locations and when the rollers 356 are above the depressions 359, the reflange 353 of the bottom frame strip 349 engages the inclined part 346 of the channel member 340 to frictionally resist horizontal movement of the door and to move the door outwardly as hereinabove described with reference to Figure 2. The roller housing 355 is provided with an upstanding lip 361 arranged to be confined between the channel web 341 and the horizontally extending member 362, thereby guiding the door during horizontal movement thereof.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. In a railway car having a door opening in a wall thereof and a door movable in a plane substantially parallel with said wall for closing said opening; means to move the door outwardly as the door is moved into closed position, and means utilizing such outward movement for forming a weather seal between the door and periphery of said door opening.

2. In a railway car having a wall, a doorway in said wall and a door movable in a plane parallel with said wall for closing said doorway; a track comprising three laterally extending parts spaced apart vertically, means including a roller attached to said door and arranged to roll the door upon the lowermost of said parts, a member secured to said door disposed between the center and uppermost of said parts, and a depression in said lowermost part arranged so that when said roller is above the depression said member engages said center part to frictionally support the door, said uppermost part arranged to engage with said member to limit upward movement of the door.

3. A structure as defined in claim 2 wherein said uppermost part is arranged to underlie and reinforce a threshold plate in said doorway.

4. In a railway car having a door opening in a wall thereof and a door movable in a plane substantially parallel with said wall for closing said opening; means to move the door outwardly as the door is moved into closed position, sealing members at edges of the door and door opening, and means utilizing such outward movement for forming a weather seal between the door and periphery of said door opening, certain of said sealing members limiting said outward movement of said door.

5. In a railway car having a wall with a doorway therein and a vertically shiftable and laterally movable door moveable parallel with said wall for closing said doorway; means to form seals above and below said doorway respectively upon a downward shifting of the door, and means to form seals at both vertical sides of the doorway upon an outward movement of the door, said last mentioned means limiting said outward movement of said door.

6. In a railway car having a wall, a doorway in said wall, a vertically shiftable and laterally moveable door moveable in a plane substantially parallel with said wall to a position opposite said doorway; vertical elements adjacent the vertical edges of said doorway, vertical members carried by said door arranged to be disposed at least partially on the inside of said elements when the door is opposite said doorway, and to limit outward movement of said door, means to dispose the weight of the door upon a downwardly and outwardly inclined surface as the door shifts downwardly so that said door is forced outwardly from said position to a fully closed position, whereby said elements and members cooperate to form a weather seal and are arranged to utilize an outward thrust on the inside of said door to form a more effective seal, and said vertical members and elements limit said outward movement of said door.

7. In a railway car having a wall, a doorway in said wall, a vertically shiftable and laterally moveable door moveable in a plane substantially parallel with said wall to a position opposite said doorway; vertical elements adjacent the vertical edges of said doorway, vertical members carried by said door arranged to be disposed at least partially on the inside of said elements when the door is opposite said doorway and to limit outward movement of said door, means to shift the weight of the door upon a structure mounted on the car to frictionally resist movement of the door parallel to said wall, means to move the door into engagement with a downwardly and outwardly inclined surface as the door shifts downwardly so that said door is forced outwardly from said position to a fully closed position whereby said elements and members cooperate to form a weather seal and further frictionally resist movement of the door parallel with said wall, and said vertical members and elements limit said outward movement of said door.

8. In a railway car having a wall, a doorway in said wall, a laterally moveable door moveable in a plane substantially parallel with said wall to a position opposite said doorway; vertical elements adjacent the vertical edges of said doorway, vertical members carried by said door arranged to be disposed at least partially on the inside of said elements when the door is opposite said doorway and to limit outward movement of said door, means to move the door outwardly from said position to a fully closed position whereby said elements and members cooperate to form a weather seal and utilize an outward thrust on the inside of said door to form a more effective seal, and said vertical members and elements limit said outward movement of said door.

9. In a railway car having a wall, a doorway in said wall, a vertically shiftable and laterally moveable door moveable in a plane substantially parallel with said wall to a position opposite said doorway, said door provided with rollers engaging a track mounted upon the car which track is provided with depressions; vertical elements adjacent the vertical edges of said doorway, vertical members carried by said door arranged to be disposed at least partially on the inside of said elements when the door is opposite said doorway and to limit outward movement of said door, a structure having a downwardly and outwardly inclined surface positioned so that as the rollers move into said depressions the door engages said inclined surface and moves downwardly and outwardly and said elements and members are caused to cooperate to form a weather seal and utilize an outward thrust on the inside of said door to form a more effective seal, and said vertical members and elements limit said outward movement of said door.

10. In a railway car having a wall, a doorway in said wall, a vertically shiftable and laterally moveable door moveable in a plane substantially parallel with said wall to a position opposite said doorway; vertical elements adjacent the vertical edges of said doorway, vertical members carried by said door arranged to be disposed at least partially on the inside of said elements when the door is opposite said doorway and to limit outward movement of said door, means to dispose the weight of the door upon downwardly and outwardly inclined surfaces above and below said doorway respectively as the door shifts downwardly so that said door is forced outwardly from said position to a fully closed position whereby said elements and members cooperate to form a weather seal at the vertical margins of the doorway and the door and the inclined surfaces cooperate to form a weather a seal above and below the doorway when the door is in said fully closed position, and said vertical members and elements limit said outward movement of said door.

11. In a railway car having a wall with a doorway therein and a vertically shiftable and laterally moveable door moveable parallel with said wall to a position opposite said doorway, and cooperative sealing members about said door and doorway; means to move the door outwardly from said position as the door shifts downwardly whereupon said cooperative means cooperate to form seals above, below, and at both vertical sides of the doorway, certain of said sealing members limiting said outward movement of said door.

12. In a railway car having a wall with a doorway therein, a vertically shiftable and laterally moveable door moveable in a plane substantially parallel with said wall to a position opposite said doorway, and cooperative sealing members about said door and doorway; means to move the door outwardly and downwardly from said position to a fully closed position so that said sealing members cooperate to form a weather seal as said door moves outwardly from opposite said opening to said closed position, certain of said sealing members limiting said outward movement of said door.

13. In a railway car having a wall with a doorway therein, a vertically shiftable and laterally moveable door moveable in a plane substantially parallel with said wall to a position opposite said doorway; cooperative loosely fitting tongue and groove sealing members between said wall and door adjacent the vertical edges thereof, said tongues being within said grooves when the door is opposite said doorway, means to move the door from said position into engagement with a downwardly and outwardly inclined surface so that said door moves outwardly and downwardly to a fully closed position whereby a seal is formed between said tongues and grooves and between said door and inclined surface, and said vertical sealing members limit said outward movement of said door.

14. In a railway car having a wall with a doorway therein, a vertically shiftable and laterally moveable door moveable in a plane substantially parallel with said wall to a position opposite said doorway; sealing members between said wall and door, means to move the door from said position into engagement with a downwardly and outwardly inclined surface so that said door is forced outwardly and downwardly to a fully closed position whereby a seal is formed between said sealing members and between said door and inclined surface, certain of said sealing members limiting said outward movement of said door.

KARL F. NYSTROM.